United States Patent [19]

Kanai

[11] Patent Number: 4,863,263
[45] Date of Patent: Sep. 5, 1989

[54] OVERHEAD PROJECTOR

[75] Inventor: Nobuo Kanai, Osaka, Japan

[73] Assignee: Minolta Camera Kabushiki Kaisha, Osaka, Japan

[21] Appl. No.: 155,619

[22] Filed: Feb. 12, 1988

[30] Foreign Application Priority Data

Feb. 13, 1987 [JP] Japan .................................. 62-31853

[51] Int. Cl.$^4$ ........................................... G03B 21/301
[52] U.S. Cl. ...................................... 353/101; 353/98; 353/DIG. 6
[58] Field of Search ................... 353/100, 101, 98, 99, 353/DIG. 3, DIG. 4, DIG. 6, 69, 70, 119, 85, 87

[56] References Cited

U.S. PATENT DOCUMENTS 3,081,670  3/1963  Weisglass ................. 353/DIG. 3 X
4,634,246  1/1987  Dreyer ..................... 353/DIG. 6 X
4,735,500  4/1988  Grunwald ................. 353/DIG. 4 X

FOREIGN PATENT DOCUMENTS 0034072  10/1971  Japan ............................ 353/DIG. 3
47-23646   7/1972  Japan .
48-31847  10/1973  Japan .
0053425    4/1977  Japan ..................................... 353/70
59-38433   3/1981  Japan .
58-32691   7/1983  Japan .

Primary Examiner—Harry N. Haroian
Attorney, Agent, or Firm—Price, Gess & Ubell

[57] ABSTRACT

A overhead projector including a projection lens and a deflection mirror for directing the light projected from the lens toward a screen, both the lens and the mirror being individually pivotally movable about horizontal axes parallel to each other and to the original support surface of a stage. The lens is pivotally movable in accordance with variations in the angle of inclination of the mirror and is also pivotally movable with the focusing operation of the lens by an interlocking mechanism. The lens is brought to a proper pivotally moved position by the mechanism according to the angle of elevation and to the focusing operation to project images free of trapezoidal distortion and less of focus.

10 Claims, 6 Drawing Sheets

OVERHEAD PROJECTOR

BACKGROUND OF THE INVENTION

The present invention relates to an overhead projector for projecting an image of an original on a screen.

When images are to be projected onto a vertical screen without any angle of elevation using conventional overhead projectors, the deflection mirror a of the projector is positioned at an angle of inclination of 45° as shown in FIG. 1. When images are to be projected at an angle of elevation (i.e., at an oblique angle above a horizontal plane; this angle will hereinafter be referred to sometimes as "oblique projection angle), the angle of inclination, 45°, of the mirror a is altered by $\theta$ as seen in FIG. 2. An image of the original c can then be projected on the vertical screen b at an angle of elevation of $2\theta$. Indicated at d is a projection lens for projecting and focusing the image on the screen.

However, the image forming plane e for the image projected at the angle $2\theta$ is inclined at the angle $2\theta$ with respect to the screen b. Consequently, the image projected on the screen b is distorted to a trapezoidal shape (trapezoidal distortion), is out of focus in the forward and rearward directions at the upper and lower portions of the screen b and is not uniformly in focus over the entire area of the screen.

The following three methods (FIGS. 3 to 5) are known for obviating these drawbacks.

With the method shown in FIG. 3, the screen b is inclined to extend along the image forming plane to eliminate trapezoidal distortion and loss of focus. However, this method requires a special screen, resulting in the disadvantage of rendering the device costly in its entirety.

In the case of the method of FIG. 4, the projection lens d is shifted toward the screen b, with the optical axis of the projection lens d intersecting an original support stage g at right angles therewith, whereby trapezoidal distortion and loss of focus can be obviated. Nevertheless, this method has the drawback of necessitating a projection lens of increased field angle thereby making the device complex.

FIG. 5 shows the third method, in which the projection lens d is inclined relative to the stage g to satisfy the Scheimpflug condition of:

$$\alpha = \tan^{-1}\left(\frac{m-f}{m} \times \tan 2\theta\right)$$

where
  m: distance between the lens d and the stage g
  f: focal distance of the lens d
  $\alpha$: angle of inclination of the lens d
  $\theta$: variation in the angle of inclination of the mirror a from 45° (oblique projection angle=$2\theta$)

This simple method is adapted to project focused images on the entire area of the screen. Various proposals resorting to this method have been made as disclosed, for example, in Examined Japanese Patent Publications SHO 47-26346 (conventional device 1) and SHO 48-31847 (conventional device 2), and Unexamined Japanese Patent Publication SHO 59-38433 (conventional device 3).

With conventional device 1, the inclination angle $\theta$ of the deflection mirror a is fixed, while the stage g is inclined with the focusing movement of the projection lens d.

With conventional device 2, the stage g is in a predetermined inclined position, and the angle of inclination $\theta$ of the deflection mirror a is variable with the focusing movement.

In the case of conventional device 3, the angle of inclination $\alpha$ of the projection lens d is adjustable independently.

Conventional devices 1, 2 and 3, nevertheless, have the problem that the oblique projection angle $2\theta$ is not settable to a desired value by varying the inclination angle $\theta$ of the deflection mirror.

Although the angle $\theta$ of the mirror of conventional device 2 is variable with the focusing movement of the projection lens, loss of focus occurs if the mirror angle $\theta$ is optionally set.

With conventional devices 1 and 3, the inclination angle $\theta$ of the mirror is fixed or is not variable with the variation in the inclination angle $\alpha$ of the projection lens, so that when the mirror angle $\theta$ is altered, the adjustment of the inclination angle $\alpha$ of the lens and focus adjustment must be made independently.

SUMMARY OF THE INVENTION

A first object of the present invention is to provide an overhead projector wherein the angle of inclination of the projection lens is automatically variable with the variation in the oblique projection angle so as to project focused images over the entire area of the screen.

To fulfill the above object, the projector of the present invention is first characterized in that it comprises a projection lens and a deflection mirror for directing the light projected from the lens toward a screen each of which is pivotally movable about an axis in parallel to the original support surface of a stage, the projector further comprising means for pivotally moving the projection lens in accordance with the variation in the oblique projection angle due to the pivotal movement of the deflection mirror.

A second object of the invention is to provide an overhead projector wherein the angle of inclination of the projection lens is automatically variable with the focusing movement of the projection lens so as to project an image on the screen at an angle of elevation, with the image focused over the entire area of the screen.

To achieve this object, the projector of the invention is further characterized in that the projection lens is pivotally movable about the axis in parallel to the original support surface of the stage, the projector including means for pivotally moving the projection lens with the focusing operation.

A further object of the invention is to provide an overhead projector wherein the angle of inclination of the projection lens is automatically variable with the variation in the oblique projection angle and/or the focusing operation of the projection lens so as to project an image as focused over the entire area of the screen.

To fulfill this object, the projector of the invention has both the first- and second-mentioned characteristics.

Still another object of the invention is to provide an overhead projector having simple means for properly varying the oblique projection angle and for also properly varying the angle of inclination of the projection lens with the focusing operation of the projection lens.

To achieve this object, the projector of the invention is further characterized in that the means for varying the oblique projection angle and for pivotally moving the projection lens with the focusing operation of the lens comprises a cam portion provided on the deflection mirror and a cam follower provided on the projection lens and in contact with the cam portion, the cam portion having a first curved face for pivotally moving the projection lens with the variation in the oblique projection angle, and a second curved face for pivotally moving the projection lens with the focusing operation of the lens.

Other objects and features of the invention will become apparent from the following description with reference to the drawings.

DETAILED DESCRIPTION OF THE INVENTION

An embodiment of the invention will be described with reference to the drawings concerned.

Figure 1:
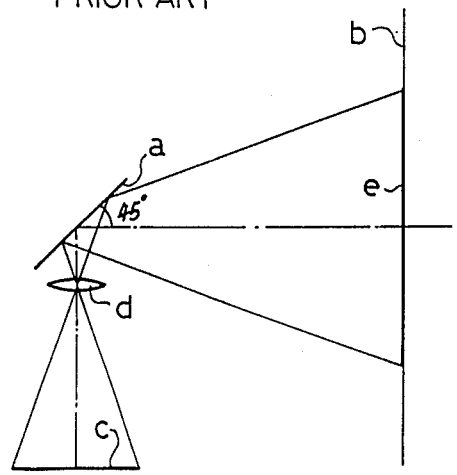
FIGS. 1 and 2 are side elevations showing the basic construction of an overhead projector for illustrating two cases in comparison, one wherein an image is projected without any angle of elevation, and the other wherein an image is projected at an angle of elevation.
Figure 2:
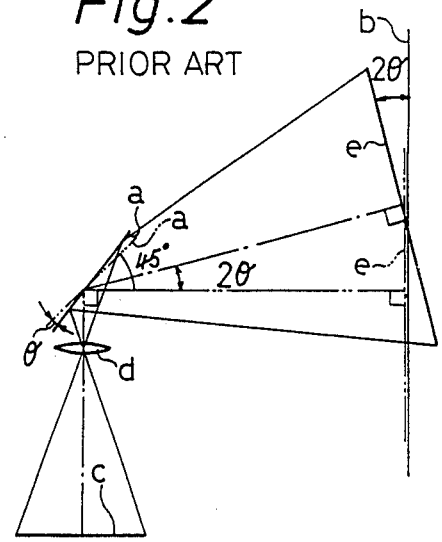
Figure 5:
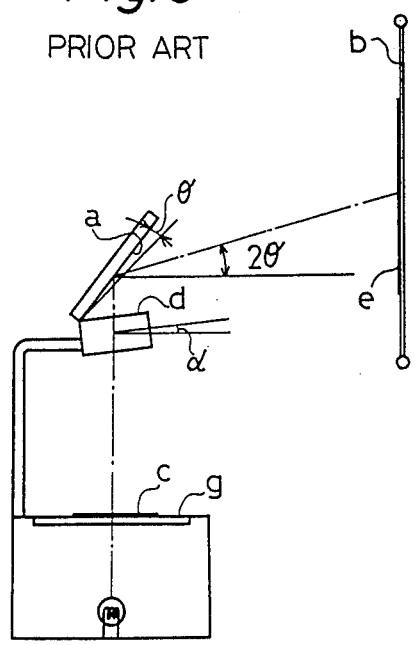
FIGS. 3 to 5 are side elevations of overhead projectors for illustrating different conventional methods of eliminating the drawbacks involved in projecting images at an angle of elevation.
Figure 3:
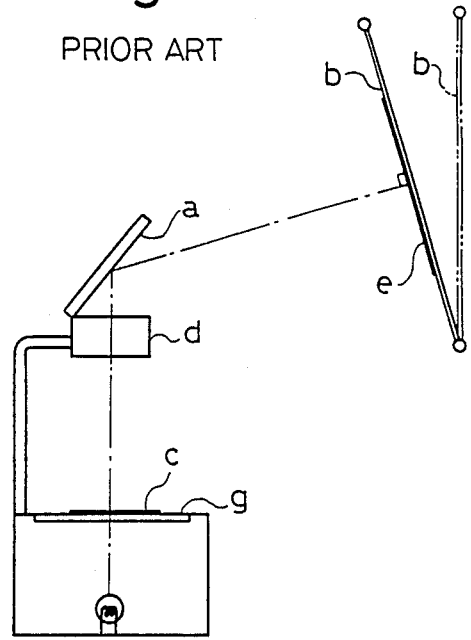
Figure 4:
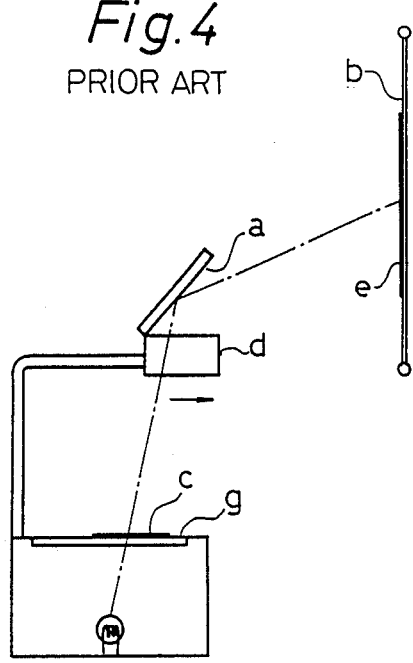
Figure 6:
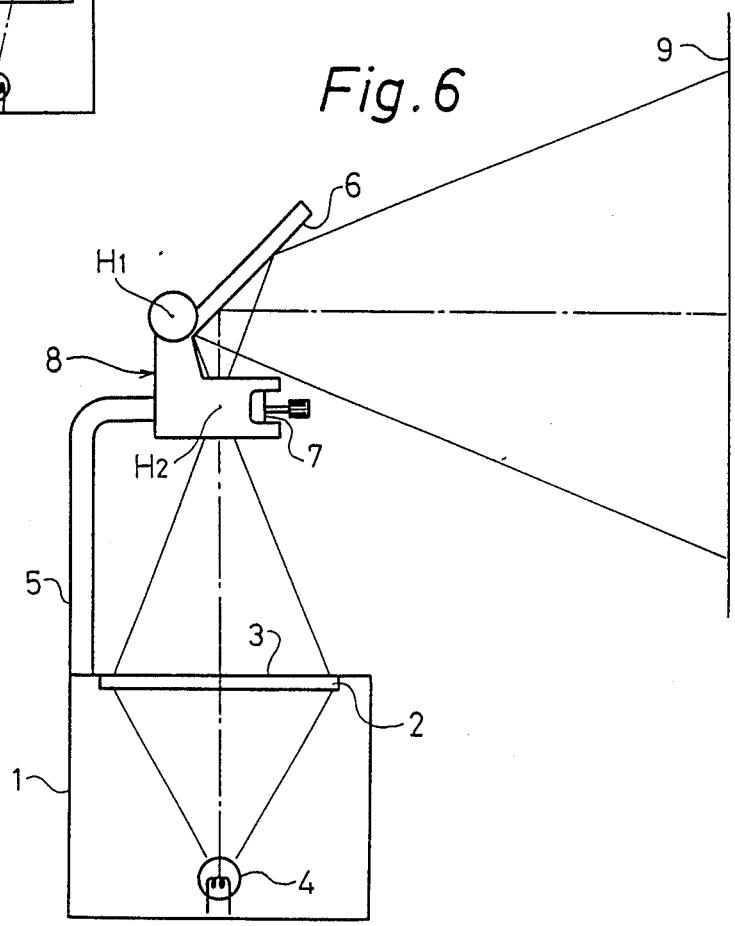
FIG. 6 is a side elevation of an overhead projector embodying the present invention.
Figure 7:
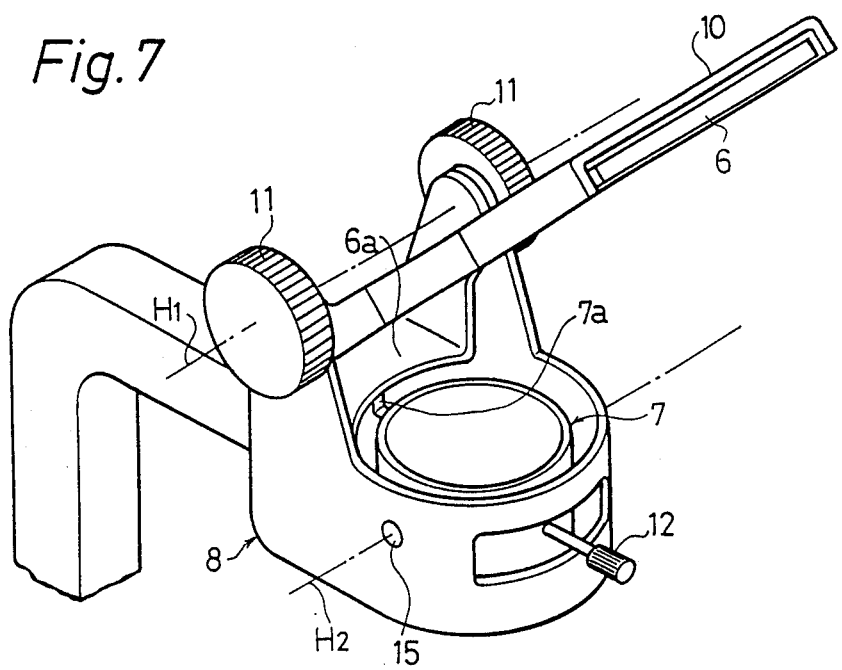
FIG. 7 is a perspective view of the projector head shown in FIG. 6.
Figure 8:
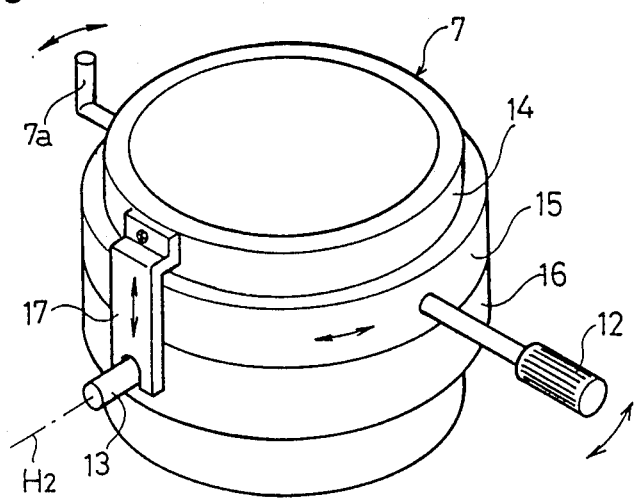
FIG. 8 is a perspective view showing a projection lens only.

FIGS. 6 to 8 show an overhead projector embodying the invention. Like those already known, the overhead projector has a base 1 provided on its upper side with a stage 3 for supporting an original thereon in the horizontal plane, and a projector head 8 disposed above the base 1.

A Fresnel lens 2 for concentrating light is disposed immediately below the stage 3. A light source 4 is provided under the lens 2. The projector head 8 is fixed to the upper end of a post 5 extending upward from one side portion of the base 1 and has a projection lens 7 for projecting an image of the original on the stage 3, and a deflection mirror 6 for directing the light projected from the lens 7 toward a screen 9. The mirror 6 and lens 7 are held on the head 8 so as to be pivotally movable respectively about axes H1 and H2 parallel to the original support surface of the stage 3.

The light from the light source 4 is concentrated into the entrance pupil of the projection lens 7 by the Fresnel lens 2. For the lens 7 to project the image of the transparent original on the screen 9, the mirror 6 flexes the optical path of projection toward the screen. When the oblique projection angle is zero, the angle of inclination of the mirror 6 is 45°. When the mirror 6 is raised by an angle of $\theta$ from the inclination angle of 45°, the image can be projected at an angle of elevation of $2\theta$.

With reference to FIG. 7, the deflection mirror 6 is attached to a mirror holder 10 and is thereby supported on the head 8 so as to be pivotally movable about the axis H1. The holder 10 has inclination adjusting knobs 11 for fixing the mirror 6 at an adjusted angle of inclination.

The projection lens 7 has a pair of opposite pivots 13 for supporting the lens on the head 8 movably about the axis H2, and a focusing knob 12 for focusing the lens 7. As shown in greater detail in FIG. 8, the lens 7 has a vertically movable rear focusing frame 14. and a front focusing frame 15 rotatable about the optical axis of the lens 7 by the focusing knob 12. These frames are held by lens holder 16.

The axis H2 about which the lens 7 is movable is parallel to the axis H1 about which the mirror 6 is movable.

The lens holder 16 has the pivots 13 projecting from the respective opposite sides thereof and in engagement with retainers 17 attached to the respective sides of the rear frame 15, whereby the rear frame 14 is restrained from rotating with the front frame 15 and guided for upward or downward movement. The rear frame 14 is fitted to the front frame 15 by a helicoid or the like and is movable upward or downward by the rotation of the front frame 15 for focusing the lens 7 with a variation in the focal length thereof, hence the rear focusing method. Thus, the lens can be focused on the screen which is at an indefinite distance therefrom, by a diminished amount of focusing movement.

Figure 9:
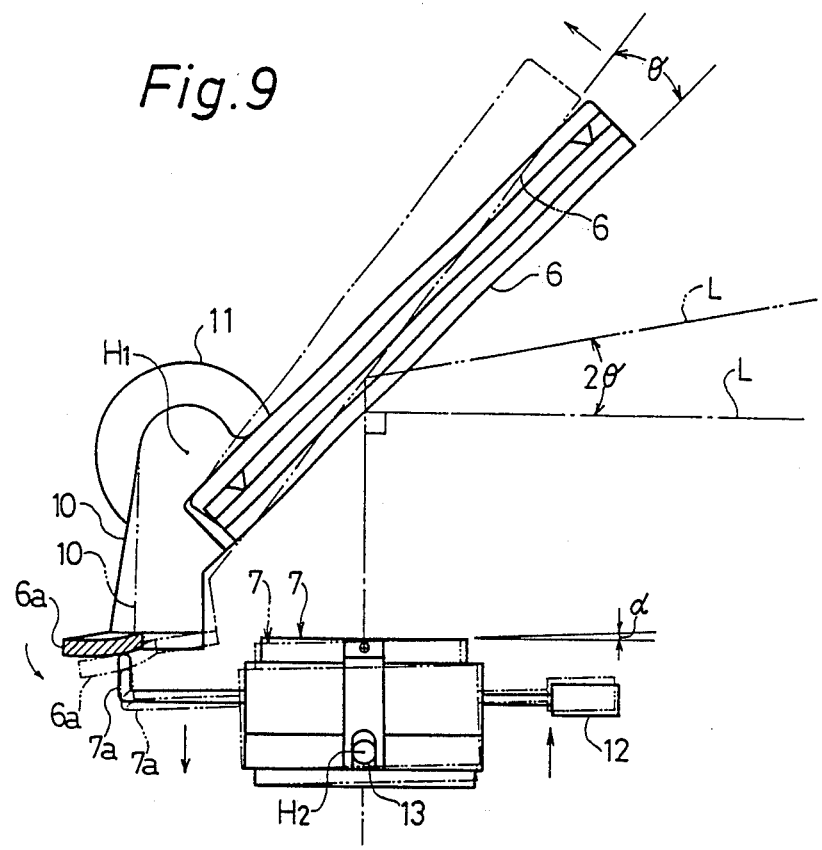
FIG. 9 is a sectional view showing the head of FIG. 7.

With reference to FIGS. 7 and 9, the deflection mirror 6 has at its lower end a movable portion 6a movable with the pivotal movement of the mirror 6, i.e., with the variation in the angle of inclination thereof, while the lens 7 is provided at one side thereof with a movable portion 7a which is movable by the rotation for focusing the lens 7. The movable portion 7a of the lens 7 is biased into contact with the movable portion 6a of the mirror 6a by unillustrated means and thereby held in pressing contact therewith at all times.

Figure 10:
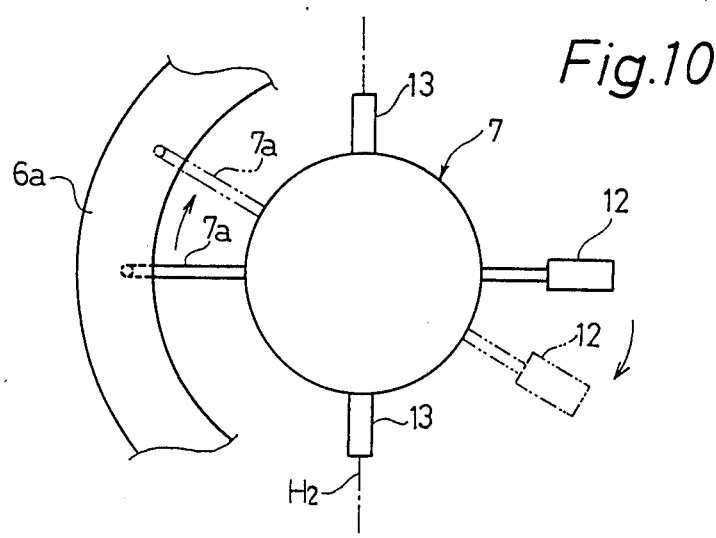
FIG. 10 is a plan view showing the cam portion of FIG. 9 on a deflection mirror and the projection lens having a cam follower in contact with the cam portion.

The movable portion 6a of the mirror 6 has a three-dimensional cam face (cam portion) for correcting the pivotally moved position of the lens 7 in accordance with variations in the inclination angle of the mirror 6 as shown in FIG. 9 and also for correcting the pivotally moved position of the focusing knob 12 in accordance with the adjusted focus of the lens 7 as seen in FIG. 10. On the other hand, the movable portion 7a of the lens 7 serves as a cam follower for the three-dimensional cam face.

When the deflection mirror 6 is moved upward, the optical path of projection, L, can be given an angle of elevation $2\theta$ which is dependent on the angle of inclination $\theta$ as shown in FIG. 9. At this time, the movable portion 6a of the mirror 6 moves downward about the axis H1, pushing the movable portion 7a of the lens 7 in the direction of arrow shown and thereby tilting the lens 7 by an angle α according to the angle θ of the mirror 6, whereby the pivotally moved position of the lens 7 is corrected. Thus the inclination can be corrected relative to the screen 9 providing a vertical image forming plane.

The movable portions 6a and 7a are so formed that the angle of inclination θ of the mirror 6 and the angle of inclination α of the lens 6 satisfy the following equation (the Scheimpflug condition):

$$\alpha = \tan^{-1}\left(\frac{m-f}{m} \times \tan 2\theta\right)$$

wherein
m: distance between lens 7 and the stage 3
f: focal distance of the lens 7

After the inclination angle θ of the mirror 6 has been thus set to a desired value, the focusing knob 12 of the lens 7 is turned as seen in FIG. 10 to focus the lens. At this time, the movable portion 6a of the mirror 6 is in its fixed position, so that the movable portion 7a of the lens 7 is moved by the turn of the knob 12, sliding on the three-dimensional cam face of the movable portion 6a, whereby the pivoted position of the lens 7 can be corrected.

In this way, the image projected at the angle of elevation of 28 can be focused over the entire area of the vertical screen 9.

Incidentally, the angle 28 given in the direction of projection increases the distance of projection to the screen 9, so that if the focal distance f of the lens 7 is great, 2θ ; and m in the above equation can be regarded as constants. The angle of inclination α of the lens 7 required is therefore small.

A description will now be given of how to determine the configuration of the three-dimensional cam face to be formed on the movable portion 6a.

Figure 11:
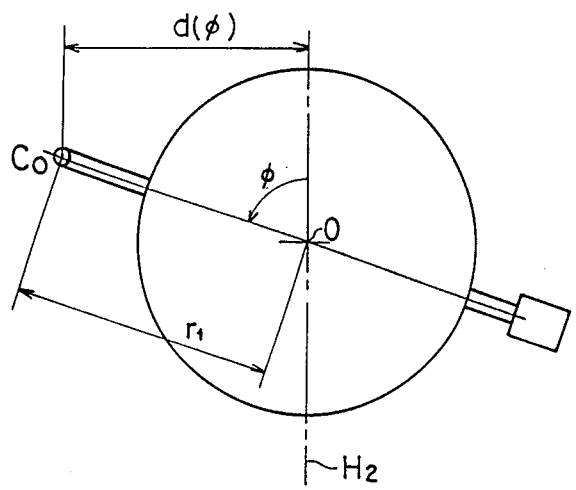
FIGS. 11 and 12 are calculation diagrams for designing the curved face of the camp portion shown in FIGS. 9 and 10.

FIG. 11 is a diagram showing the projection lens 7 as it is seen from above. It is assumed that the distance from the center O of the lens 7 to the center Co of the movable portion 7a, cam follower, is r1. It is further assumed that when the angle between the axis H2 and $\overline{OCo}$ is φ, the rear frame 14 is fitted to the front frame 15 as by a helicoid so as to give a focal distance of f(φ) to the projection lens 7. The distance d(φ) between the axis H2 and the center Co is then given by:

$$d(\phi) = r1 \times \sin\phi \quad (1)$$

Figure 12:
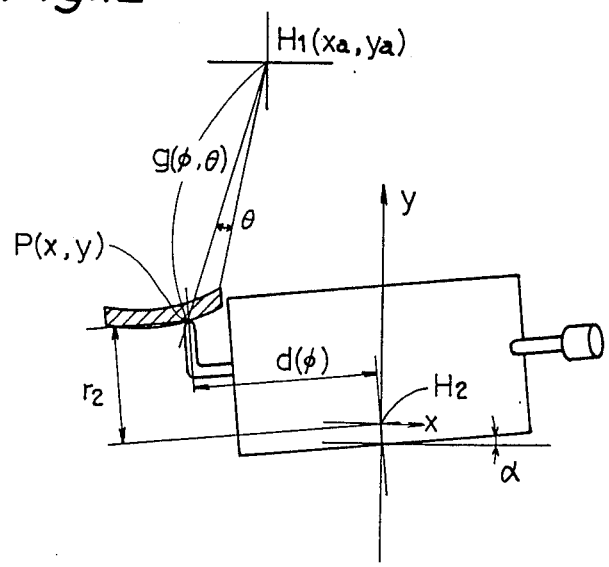

FIG. 12 is a diagram showing the movable portion 7a on a plane perpendicular to the axis H2 and through the center Co. A coordinate system is considered with x-axis and y-axis set as illustrated and the axis H2 as the origin to express the position of the axis H1 as ($x_a$, $y_a$). As shown in FIG. 12, it is assumed that the center Co is r2 above the axis H2 in the direction of the optical axis of the lens 7.

In the above arrangement, it is further assumed that when the mirror 6 is raised through an angle θ from the position at an inclination angle of 45°, the movable portion 7a is in contact with the movable portion 6a at point P(x, y). Suppose the distance between the axis H1 and point P is g(φ, θ).

When the mirror 6 is raised through the angle θ from the inclined position at 45°, α is given by:

$$\alpha = \tan^{-1}\left(\frac{m - f(\phi)}{m} \times \tan 2\theta\right) \quad (2)$$

Point P(x, y) is given by:

$$\left.\begin{aligned} x &= d(\phi) \times \cos\alpha - r2 \times \sin\alpha \\ y &= -d(\phi) \times \sin\alpha + r2 \times \cos\alpha \end{aligned}\right\} \Delta(2)$$

Accordingly, the distance g (φ, θ) is given by:

$$g(\phi, \theta) = \sqrt{(x_a - x)^2 + (y_a - y)^2} \quad (3)$$

Figure 15:
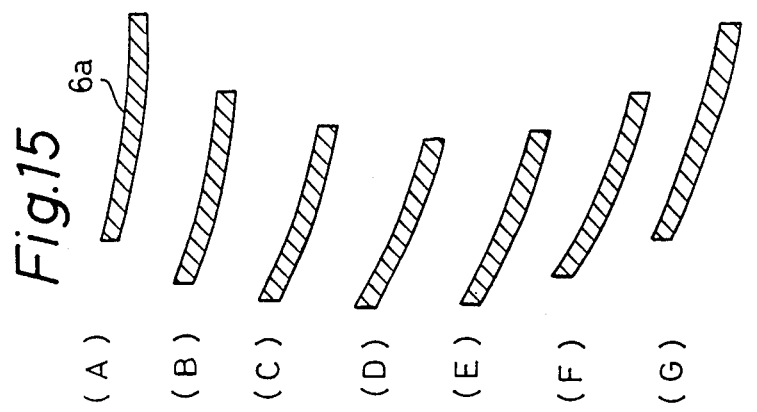
FIGS. 15 (a) to (g) are views in section taken along the lines A—A, B—B, ..., G—G in FIG. 13, respectively.
Figure 13:
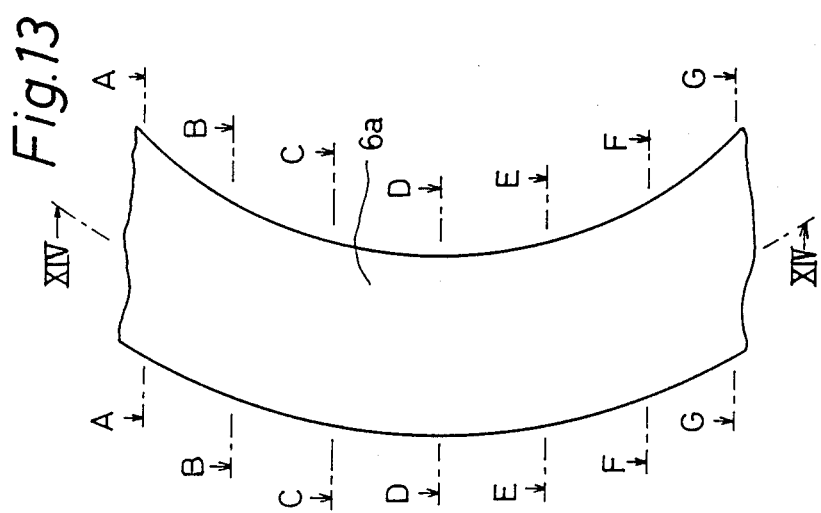
FIG. 13 is a fragmentary plan view showing the cam portion as actually designed as an example.
Figure 14:
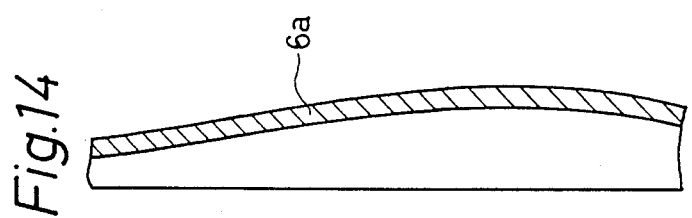
FIG. 14 is a view in section taken along the line XIV—XIV in FIG. 13.

With g(φ, θ) thus determined, the configuration of the three-dimensional cam face determined, for example, as illustrated in FIGS. 13 to 15.

In addition to the foregoing embodiment, the present invention can be embodied variously. With the above embodiment, the deflection mirror movable portion is provided with a three-dimensional cam face including a cam portion for correcting the pivotally moved position of the projection lens 7 in accordance with variations in the inclination angle of the deflection mirror and a cam portion for correcting the pivotally moved position of the lens in accordance with the adjusted focus of the lens, whereas these cam portions may be provided, for example, on the movable portion of the projection lens, or may be formed separately on the respective movable portions. Furthermore, one of these two cam portions can be provided as required.

What is claimed is:
1. An overhead projector comprising:
a light source for illuminating an original,
a stage having a horizontal surface for supporting the original thereon,
a projection lens for projecting onto a screen an image of the original illuminated with the light from the light source, the projection lens being pivotally movable about an axis parallel to the original support surface of the stage,
a deflection mirror for directing the image passing through the projection lens toward the screen, the deflection mirror being pivotally movable about an axis parallel to the pivotal axis for the projection lens, and
means for pivotally moving the projection lens in accordance with variations in the angle of inclination of the deflection mirror due to the pivotal movement of the mirror which includes a cam portion provided on the deflection mirror, and a cam follower provided on the projection lens and in contact with the cam portion.

2. An overhead projector as defined in claim 1 wherein the deflection mirror is disposed immediately above the projection lens.

3. An overhead projector comprising:
a light source for illuminating an original,
a stage having a horizontal surface for supporting the original thereon,
a projection lens for projecting onto a screen an image of the original illuminated with the light from the light source, a deflection mirror for directing the image passing through the projection lens towards the screen, means for focusing the projection lens, and means for pivotally moving the projection lens during the focusing operation by the focusing means, about an axis parallel to the original support surface of the stage.

4. An overhead projector as defined in claim 3 wherein the focusing means focuses the projection lens by rotating about the optical axis of the lens.

5. An overhead projector as defined in claim 4 wherein the projection lens comprises a rear group of lens elements on the image side and a front group of lens elements on the object side, and the rear group is shiftable axially of the lens relative to the front group by the rotation of the focusing means.

6. An overhead projector as defined in claim 5, further including moving means for pivotally moving the deflection mirror, in coordination with the movement of the projection lens, about an axis parallel to the axis for the projection lens.

7. An overhead projector as defined in claim 6 wherein the pivotally moving means includes a cam portion provided on the deflection mirror, and a cam follower in contact with the cam portion and movable with the focusing movement by the focusing means.

8. An overhead projector as defined in claim 7 wherein the cam portion comprises in three-dimensional combination a first curved face for pivotally moving the projection lens in accordance with variations in the angle of inclination of the deflection mirror due to the pivotal movement of the mirror and a second curved face for pivotally moving the projection lens with the focusing movement.

9. An overhead projector comprising:

a light source for illuminating an original;

a stage having a horizontal surface for supporting the original thereon;

a projection lens projecting onto a screen an image of the original illuminated with the light from the light source, the projection lens being pivotally movable about an axis parallel to the original support surface of the stage;

a deflection mirror for directing the image passing through the projection lens towards the screen, the deflection mirror being pivotally movable about an axis parallel to the pivotal axis for the projection lens;

means for pivotally moving the projection lens in accordance with variations in the angle of inclination of the deflection mirror due to the pivotal movement of the mirror, and means for focusing the projection lens, whereby the moving means pivotally moves the projection lens in accordance with a focusing operation by the focusing means.

10. An overhead projector as defined in claim 9 wherein the pivotally moving means includes a cam portion provided on the deflection mirror and a cam follower provided on the projection lens, and the cam portion comprises in three-dimensional combination a first curved face for pivotally moving the projection lens in accordance with variations in the angle of inclination of the deflection mirror due to the pivotal movement of the mirror and a second curved face for pivotally moving the projection lens with the focusing operation.

* * * * *